United States Patent
Geisler et al.

(10) Patent No.: US 8,187,721 B2
(45) Date of Patent: May 29, 2012

(54) LASER WELDED SEAT STRUCTURE

(75) Inventors: Axel Geisler, Burscheid (DE); Michael Hamers, Biedenkopf (DE); Andreas Schmitter, Wuppertal (DE); Henri Kirchhof, Frechen-Kleinkönigsdorf (DE); Mathew Cooper, Kleinostheim (DE); Sven Bronich, Leverkusen (DE); Jürgen Otto, Burscheid (DE); Klaus Hemmelmann, Odenthal (DE)

(73) Assignee: Johnson Controls GmbH, Burscheid (DE)

( * ) Notice: Subject to any disclaimer, the term of this patent is extended or adjusted under 35 U.S.C. 154(b) by 741 days.

(21) Appl. No.: 11/664,931

(22) PCT Filed: Oct. 4, 2005

(86) PCT No.: PCT/EP2005/054991
§ 371 (c)(1),
(2), (4) Date: Nov. 20, 2009

(87) PCT Pub. No.: WO2006/040276
PCT Pub. Date: Apr. 20, 2006

(65) Prior Publication Data
US 2010/0062223 A1  Mar. 11, 2010

(30) Foreign Application Priority Data
Oct. 7, 2004 (DE) .......... 10 2004 049 115

(51) Int. Cl.
*B32B 3/10* (2006.01)
*B23K 26/22* (2006.01)
(52) U.S. Cl. .... 428/594; 428/596; 228/190; 219/121.64

(58) Field of Classification Search .................. None
See application file for complete search history.

(56) References Cited

U.S. PATENT DOCUMENTS

| | | | | |
|---|---|---|---|---|
| 2,516,365 | A | * | 7/1950 | Carraher .................. 74/445 |
| 2,878,552 | A | * | 3/1959 | Wirt .................. 428/594 |
| 2,928,364 | A | * | 3/1960 | Davis .................. 269/41 |
| 3,492,074 | A | | 1/1970 | Rendina |
| 3,584,657 | A | * | 6/1971 | Dorr et al. .................. 138/142 |
| 4,237,364 | A | | 12/1980 | Lemelson |

(Continued)

FOREIGN PATENT DOCUMENTS

DE  1 808 965  6/1969

(Continued)

OTHER PUBLICATIONS

International Search Report for PCT/EP2005/054991, date of mailing Dec. 19, 2005, 3 pages.

*Primary Examiner* — John J Zimmerman
(74) *Attorney, Agent, or Firm* — Foley & Lardner LLP

(57) ABSTRACT

A structure includes a first part provided in a first plane and second and third parts provided in a second plane located under the first plane. The second and third parts are welded together at a welded seam. The first part has at least one recess configured to receive a welding mechanism that forms the welded seam on the second and third parts. Another structure includes an "n" number of layers, n being at least three. Adjacent layers are in contact with one another and are connected by a welded seam. The structure also includes an outer surface. The layers between the outer surface and the respective welded seam define a recess through which a welding mechanism is configured to be passed as far as the respective layers to be welded to produce the welded seam.

9 Claims, 2 Drawing Sheets

U.S. PATENT DOCUMENTS

| | | | |
|---|---|---|---|
| 5,293,023 A * | 3/1994 | Haruta et al. | 219/121.6 |
| 5,791,043 A * | 8/1998 | Okabe et al. | 29/890 |
| 6,682,625 B1 * | 1/2004 | Futamura et al. | 156/252 |
| 2010/0181816 A1 * | 7/2010 | Kienke et al. | 297/362 |

FOREIGN PATENT DOCUMENTS

| | | |
|---|---|---|
| DE | 199 05 215 | 8/2000 |
| EP | 0 919 306 | 6/1999 |
| JP | 58-110176 | 6/1983 |
| JP | 58-110176 A | 6/1983 |
| JP | 54-125149 * | 9/1989 |
| JP | 09-247908 * | 9/1997 |
| JP | 10-244650 * | 9/1998 |
| JP | 10-313556 * | 11/1998 |
| JP | 10-313556 A | 11/1998 |
| JP | 2000-000690 * | 1/2000 |
| JP | 2000-174152 * | 6/2000 |
| JP | 2003-325262 A | 11/2003 |
| JP | 2004-049740 A | 2/2004 |

* cited by examiner

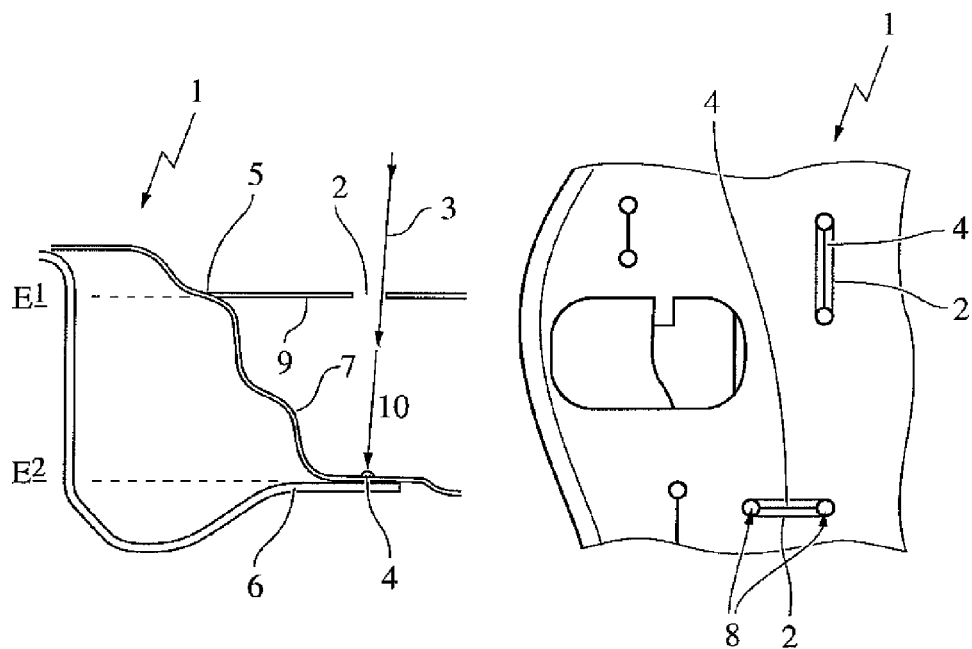
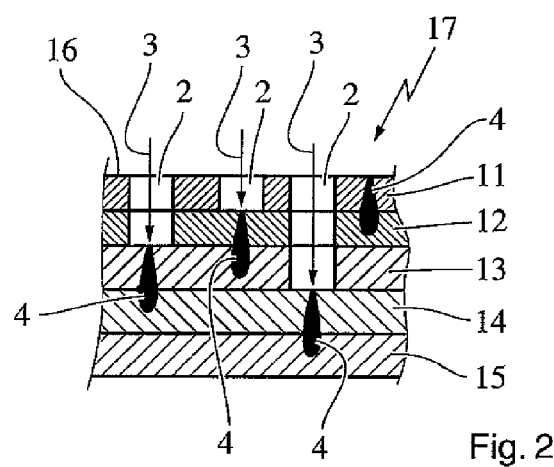
Fig. 1
Fig. 2

400
LASER WELDED SEAT STRUCTURE

CROSS-REFERENCE TO RELATED PATENT APPLICATIONS

The present application is a National Stage of International Application No. PCT/EP2005/054991 filed on Oct. 4, 2005, which claims the benefit of German Patent Application No. DE 10 2004 049 115.1 filed on Oct. 7, 2004. The entire disclosures of International Application No. PCT/EP2005/054991 and German Patent Application No. DE 10 2004 049 115.1 are incorporated herein by reference.

BACKGROUND

The present disclosure relates to a structure having "n" number of multiple portions in separate planes and a welded seam on at least one of the planes. , The present disclosure also relates to such a structure where "n" is at least three. The present disclosure also relates to methods of welding such structures.

In industrial production, such as the manufacture of automobiles, structural elements of increasing complexity are manufactured that include of a plurality of portions or parts arranged on a plurality of planes that have to be welded to one another. Currently, welding such structural elements is relatively complicated since the structures have to be turned during welding. Accordingly, there is a need to provide a structure and a method of welding that does not have the drawbacks of the prior art.

SUMMARY

One exemplary embodiment relates to a structure including a first part provided in a first plane and second and third parts provided in a second plane located under the first plane. The second and third parts are welded together at a welded seam. The first part has at least one recess configured to receive a welding mechanism that forms the welded seam on the second and third parts.

Another exemplary embodiment relates to a structure including an "n" number of layers, n being at least three. The n layers are stacked as a laminate. Adjacent layers are in contact with one another and are connected by a welded seam. The structure also includes an outer surface. The layers between the outer surface and the respective welded seam define a through-recess through which a welding mechanism is configured to be passed as far as the respective layers to be welded to produce the welded seam.

Another exemplary embodiment relates to a method for welding a structure with a first portion at a first plane and second and third portions at a second plane. The method includes the steps of passing a welding mechanism through a recess defined by the first portion, and welding a welded seam at the second plane via the welding mechanism passing through the recess defined by the first portion.

BRIEF DESCRIPTION OF THE DRAWINGS

FIG. 1 is a planar view and a partial, cross-sectional view of a structure according to an exemplary embodiment, FIG. 2 is a partial, cross-sectional view of a structure according to an exemplary embodiment.

DETAILED DESCRIPTION

Figure 3:
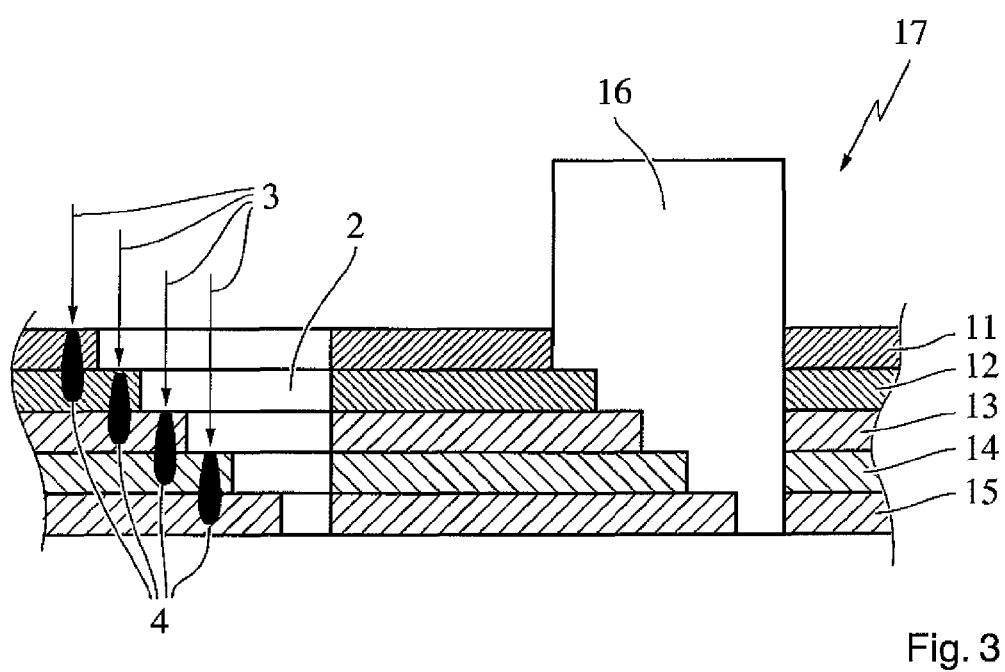
FIG. 3 is a partial, cross-sectional view of a structure according to another exemplary embodiment.

According to an exemplary embodiment, a structure includes a first and/or a second plane and a welded seam. The structure includes at least one recess in the first plane through which a welding mechanism or means may be passed. The welding means forms a welded seam on the second plane. Such a structure is exceptionally simple and cost-effective to produce since its position does not have to be altered during welding. For purposes of the present disclosure, the phrase welding mechanism or means is used broadly to refer to any welding process or technology known to the person skilled in the art and provides sufficient weld energy to create the weld seam. According to an exemplary embodiment, the welding means is a laser beam. For such an embodiment, a further means, such as a tube, may also be passed through the recess by means of which a plasma cloud, which is formed during the laser welding, is blown away.

According to an exemplary embodiment, the structure includes at least one recess in a first plane that is sufficiently sized so that the welding means can be passed therethrough to form a welded seam on the second plane. According to an exemplary embodiment, the at least one recess in the first plane is also sufficiently large enough for one or more (i.e., preferably at least two) retainers to be able to be additionally passed through the recess or aperture. The retainers fix the parts on the second plane, on which the welding is to be carried out, in a specific position before and/or during the welding. According to an exemplary embodiment, the structure includes additional recesses through which the retainers are then passed to the second plane.

The structure may be produced from any material familiar to the person skilled in the art. According to an exemplary embodiment, the structure is a metal structure, such as sheet steel. According to an exemplary embodiment, the structure is a component used in automobiles. For example, the structure may be a backrest structure for a vehicle seat. According to an exemplary embodiment, the structure is a closed structure with a hollow space which is only accessible through the recesses. According to an exemplary embodiment, the structure has welded seams on both planes.

According to an exemplary embodiment, the structure is composed of n adjacent layers, and a surface. According to an exemplary embodiment, n is greater than or equal to 3. When n equal 3, there are two respective layers in contact with one another and connected to one another by a welded seam. The layers between the surface and the respective welded seam include a through-recess through which a welding means (for producing the welded seam) may be passed as far as the respective layers to be welded. According to such an embodiment, it is possible to weld together a laminate structure consisting of a plurality of layers after the layers have been layered on top of one another. With the layers in contact with one another being welded to one another, the structure may be manufactured simply and cost-effectively with a high mechanical stability.

The layers may consist of any desired weldable material. According to an exemplary embodiment, the layers are sheet metal, such as sheet steel.

According to an exemplary embodiment, the structure comprises at least n-2 recesses. For such an embodiment, it is possible to weld together all respective layers of the structure in contact with one another.

According to an exemplary embodiment, the structure has at least one aperture (and preferably has a plurality of apertures) widening toward the surface. Such an embodiment has the advantage that inside one aperture all layers of the structure in contact with one another may be respectively connected to one another. According to an exemplary embodiment, this aperture has a step-like structure. For such an embodiment, the laser beam is respectively oriented with the levels of the steps in order to weld together the two layers located under the laser beam.

In the event that the structure has a plurality of apertures, these apertures may also be used to align the layers of the structure with one another. For example, such alignment may be carried out by an adjusting die that is reversibly introduced into the respective aperture and fixes the position of at least two layers (and optionally all layers) of the structure to one another.

According to an exemplary embodiment, a method for welding a structure having a first and second plane includes the steps of passing a welding means through a recess in the first plane and forming a weld seam on the second plane. Such a method may be carried out relatively simply and cost-effectively since the position of the structure to be manufactured does not have to be altered during the manufacturing process. According to an exemplary embodiment, at least one retainer is passed through a recess in the first plane to hold together the parts to be welded, before and/or during the welding. According to an exemplary embodiment, a means is also passed through the recess in the first plane to blow away a plasma cloud which is located between the first and the second plane. According to an exemplary embodiment, the method provides welded seams arranged not only on the first plane but also on the second plane. According to an exemplary embodiment, the position of the structure is not altered during the welding method.

The exemplary embodiments described above are explained with reference to FIGS. 1 through 3. These explanations are merely by way of example and do not limit the disclosure.

Referring to FIG. 1, a structure 1 is shown according to an exemplary embodiment in two views (i.e., a front view and a cross-sectional view). Referring to the cross-sectional view of FIG. 1 in particular, the structure 1 includes three parts 6, 7, 9 which are welded together by the welded seams 4, 5. The structure has two planes E1 and E2 defining a hollow space 10. According to an exemplary embodiment, the structure in the plane E1 has a recess 2 through which a laser beam 3 may be passed that carries out welding on the plane E2 for producing the welded seam 4. As a result, the component does not have to be rotated during the welding. All welding may be carried out from above the component.

Referring to the front, planar view of FIG. 1 in particular, the recesses 2 are sufficiently sized to, not only receive a welded seam 4, but for receiving retainers 8 that are passed through the plane E1 to hold together (before and during the welding) metal sheets on the plane E2 to be welded together. This also may apply to any extra holes in the plane E1 for the retainers 8.

FIG. 2 shows a laminate structure 17 including five sheet-metal layers 11 through 15. In the laminate 17, the layers that are in contact with one another (i.e. shown as being directly superimposed on one another) are connected to one another by a respective welded seam 4. According to an exemplary embodiment, the laminate 17 has apertures, recess or bores 2 that extend from a first surface 16 of the laminate 17 to the layer 11 which is to be connected to the underlying layer 12. To connect the respective layers to one another, a welding means (e.g., a laser beam) is introduced into the aperture 2. The welding means fuses the layers 11 and 12 adjoining the recess 2 so that the layers 11 and 12 are integrally connected to one another after the subsequent cooling thereof. The person skilled in the art recognizes that with large-surface laminates the respective layers of the laminates are repeatedly connected to one another or the respective welded seams 4 are designed to be large-surface welded seams.

Referring to FIG. 3, the laminate 17 is shown according to another exemplary embodiment. According to the embodiment illustrated, the recess 2 extends through the entire laminate and has a step-like structure. The welding means (e.g., a laser beam 3) is aligned with the respective step during welding and partially fuses at least the underlying layer so that said layers are integrally connected to one another after the cooling thereof. According to an exemplary embodiment, the welding means partially fuses at least two underlying layers. An adjusting die 18, which serves to align the layers 11 through 15 during the welding, is inserted into the recess 2. The die 18 is inserted into the recesses which are not being currently welded.

The invention claimed is:

1. A structure comprising:
    an "n" number of layers, wherein n is selected to be at least three, and the n number of layers are stacked as a laminate structure with adjacent layers being connected by a welded seam; and
    an outer surface of the structure,
    wherein the layers between the outer surface and the respective welded seam include a recess through which a welding mechanism is configured to be passed as far as the respective layers to be welded to produce the welded seam,
    wherein the recess of the structure defines an aperture that widens toward the outer surface.

2. The structure of claim 1 wherein the aperture is configured to receive an adjusting die for aligning the layers of the laminate structure.

3. The structure of claim 1 wherein each of the "n" number of layers is made of metal containing material.

4. The structure of claim 1 wherein the structure is designed to be used as a backrest frame for a vehicle seat.

5. The structure of claim 1 further comprising at least one retainer and wherein the recess is configured to receive the at least one retainer for securing together adjacent layers.

6. The structure of claim 1 wherein the welding mechanism is a laser beam.

7. The structure of claim 6 wherein the recess is configured to receive a tube for delivering a gas for blowing away a plasma cloud created by the laser beam.

8. The structure of claim 1 wherein the aperture has a stepped profile.

9. The structure of claim 8 wherein a step is provided between each layer and a welded seam is provided on an upper surface of each step that is above at least two layers.

* * * * *